US012236638B2

(12) United States Patent
Grancharov et al.

(10) Patent No.: US 12,236,638 B2
(45) Date of Patent: Feb. 25, 2025

(54) OBJECT TRACKING AND DETECTION IN AUGMENTED REALITY APPLICATIONS

(71) Applicant: Telefonaktiebolaget LM Ericsson (publ), Stockholm (SE)

(72) Inventors: Volodya Grancharov, Solna (SE); Harald Pobloth, Täby (SE); Sigurdur Sverrisson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 897 days.

(21) Appl. No.: 17/050,497

(22) PCT Filed: Apr. 26, 2018

(86) PCT No.: PCT/EP2018/060727
§ 371 (c)(1),
(2) Date: Oct. 26, 2020

(87) PCT Pub. No.: WO2019/206413
PCT Pub. Date: Oct. 31, 2019

(65) Prior Publication Data
US 2021/0118175 A1 Apr. 22, 2021

(51) Int. Cl.
*G06T 7/73* (2017.01)
*G06T 7/20* (2017.01)
(Continued)

(52) U.S. Cl.
CPC ............ *G06T 7/75* (2017.01); *G06T 7/20* (2013.01); *G06T 11/20* (2013.01); *G06T 19/006* (2013.01);
(Continued)

(58) Field of Classification Search
CPC ... G06T 7/75; G06T 7/20; G06T 11/20; G06T 19/006; G06T 2207/10016; G06T 2210/12;
(Continued)

(56) References Cited

U.S. PATENT DOCUMENTS 9,443,320 B1    9/2016  Gaidon et al.
2011/0142282 A1*  6/2011  Srikrishnan ............ G06T 7/277
                                                        382/103

(Continued)

FOREIGN PATENT DOCUMENTS

WO    2016 077010 A1    5/2016
WO    2016 099866 A1    6/2016

OTHER PUBLICATIONS

YOLO9000: Better, Faster, Stronger by Joseph Redmon and Ali Farhadi—2016.
(Continued)

*Primary Examiner* — Nimesh Patel
(74) *Attorney, Agent, or Firm* — Baker Botts L.L.P.

(57) ABSTRACT

Object tracking for augmented reality involves determining a location of an object in a current frame (10) of a video stream based on object feature representations extracted from different locations in the current frame (10) and object feature representations belonging to a model of the object. The model comprises at least one object feature representation extracted from at least one previous frame (20) of the video stream and at least one object feature representation from a feature set comprising at least one server-generated object feature representation of objects belonging to a same object class as the object.

12 Claims, 10 Drawing Sheets

(51) Int. Cl.
*G06T 11/20* (2006.01)
*G06T 19/00* (2011.01)

(52) U.S. Cl.
CPC ...... *G06T 2207/10016* (2013.01); *G06T 2210/12* (2013.01)

(58) Field of Classification Search
CPC . G06T 7/73; G06T 2207/30244; G06T 7/246; G06T 7/70; G06T 17/00; G06T 2207/30201; G06T 7/50; G06T 2207/10012; G06T 7/00; G06T 1/00; G06T 2200/04; G06T 2207/20221; G06T 7/292; G06T 2207/20084; G06T 2207/20172; G06T 7/85; G06T 5/50; G06T 2207/20081; G06T 2207/30252; G06T 2207/30256; G06T 7/55; G06T 7/593; G06T 7/62; G06F 3/011; G06F 3/013; G06F 3/012; G06F 2203/012; G06F 11/3055; G06F 11/3438; G06F 18/24323; G06F 18/254; G06F 18/24; G06V 20/20; G06V 20/46; G06V 10/764; G06V 40/161; G06V 40/16; G06V 10/40; G06V 40/28; G06V 10/28; G06V 40/103; G06V 40/193; G06V 20/40; G06V 20/64; G06V 2201/07; G06V 40/20; G06V 10/10; G06V 10/443; G06V 10/82; G06V 20/647; G06V 2201/06; G06V 40/10; G06V 40/174; G06V 40/18; G06N 3/08; G06N 20/00; G06N 3/045; G06N 5/025; G06N 3/044; G06N 20/10; G06N 3/008; G06N 3/048; G06N 3/049; G06N 5/022; G06N 5/04

See application file for complete search history.

(56) References Cited

U.S. PATENT DOCUMENTS

| | | | | |
|---|---|---|---|---|
| 2013/0114849 | A1* | 5/2013 | Pengelly | G06V 10/95 382/103 |
| 2014/0237595 | A1* | 8/2014 | Sridhara | G06F 21/566 709/224 |
| 2016/0148054 | A1* | 5/2016 | Han | G06T 7/269 382/103 |
| 2018/0137892 | A1* | 5/2018 | Ding | G11B 27/031 |
| 2019/0266733 | A1* | 8/2019 | Yang | H04N 21/23418 |
| 2019/0385291 | A1* | 12/2019 | Tanaka | H04N 7/0117 |

OTHER PUBLICATIONS

Novel Applications of VR, Efficient Mobile AR Technology Using Scalable Recognition and Tracking Based on Server-Client Model by Jinki Jung et al.—May 9, 2011.
Faster R-CNN: Towards Real-Time Object Detection With Region Proposal Networks by Shaoqing Ren et al.—2016.
Glimpse: Continuous, Real-Time Object Recognition on Mobile Devices by Tiffany Yu-Han Chen et al.—2015.
High-Speed Tracking With Kernelized Correlation Filters by Joao F. Henriques et al.; IEEE Transactions on Pattern Analysis and Machine Intelligence—2014.
PCT Notification of Transmittal of the International Search Report and the Written Opinion of the International Searching Authority, or the Declaration issued for International application No. PCT/EP2018/060727—Jan. 28, 2019.
Mobile Object Detection Through Client-Server Based Vote Transfer by Shyam Sunder Kumar et al., Dept. of Electrical and Computer Engineering, University of Michigan at Ann Arbor, USA—2012.
Rapid Object Detection Using a Boosted Cascade of Simple Features by Paul Viola and Michael Jones, TR-2004-043—May 2004.
Server-Side Object Recognition and Client-Side Object Tracking for Mobile Augmented Reality by Stephan Gammeter et al.—2010.

* cited by examiner

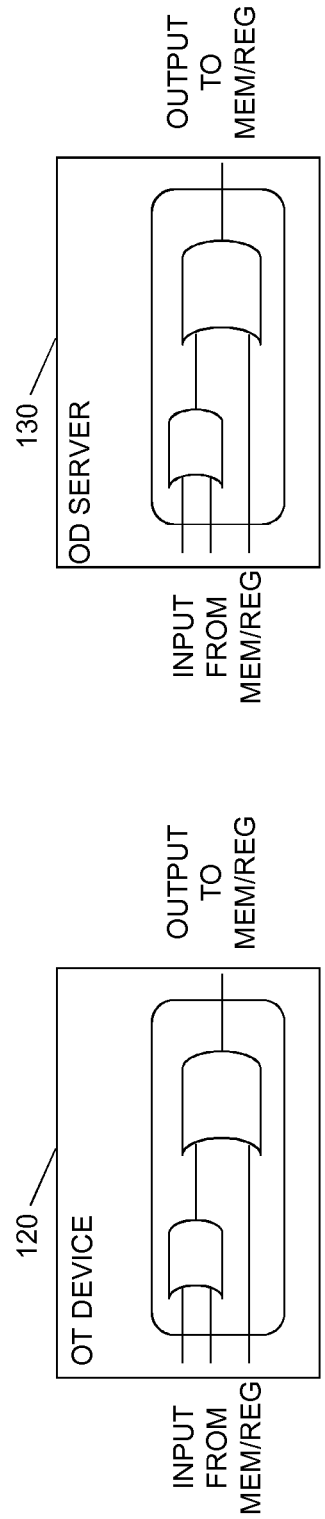

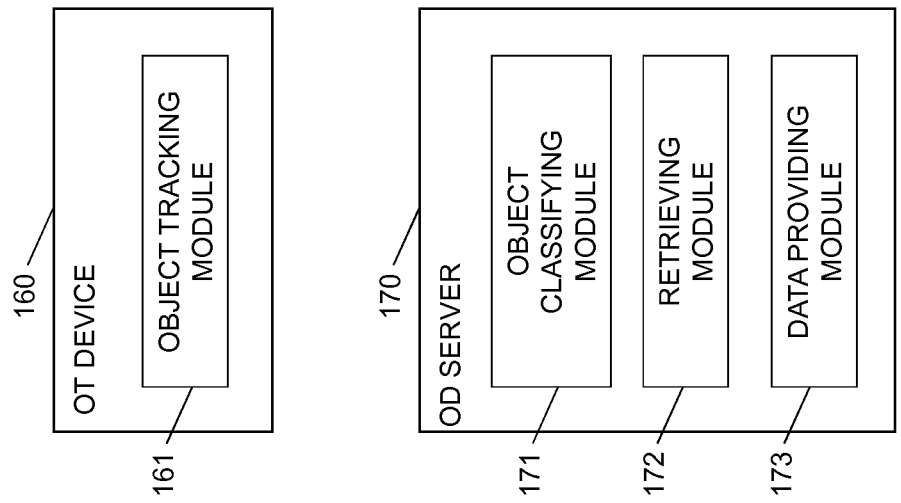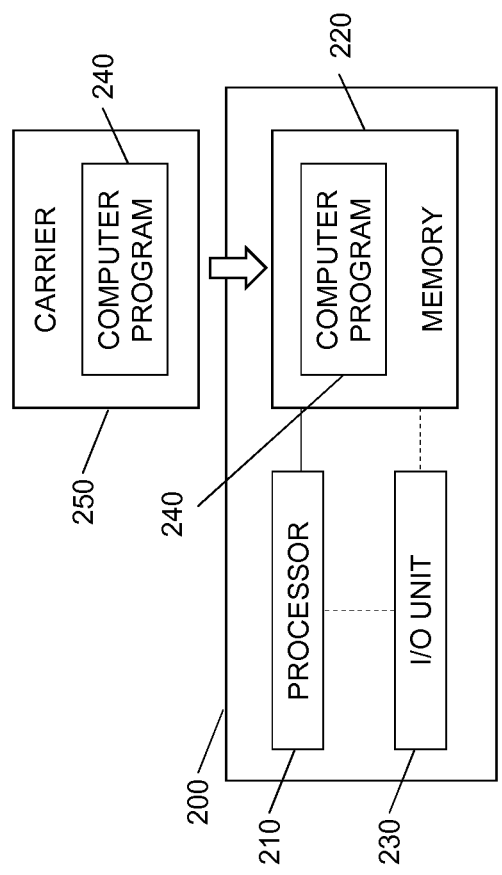

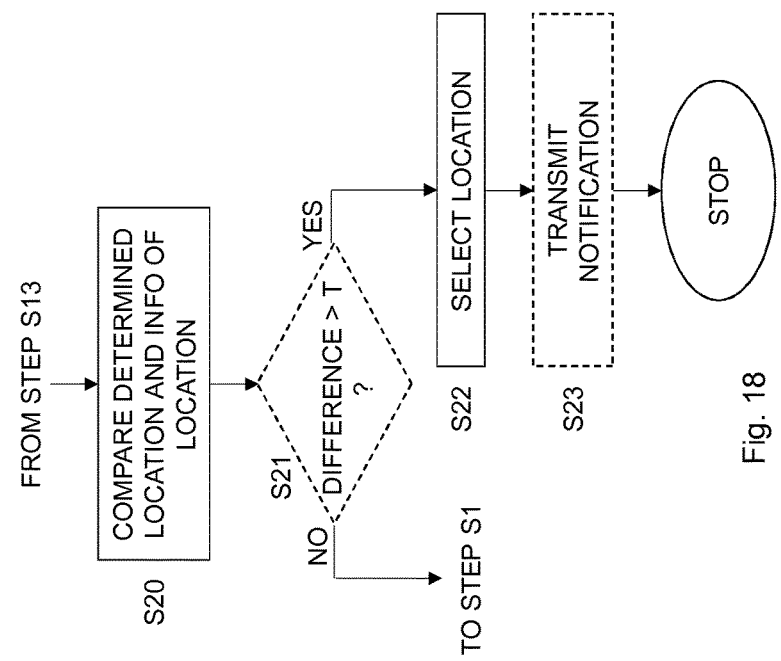
Fig. 18
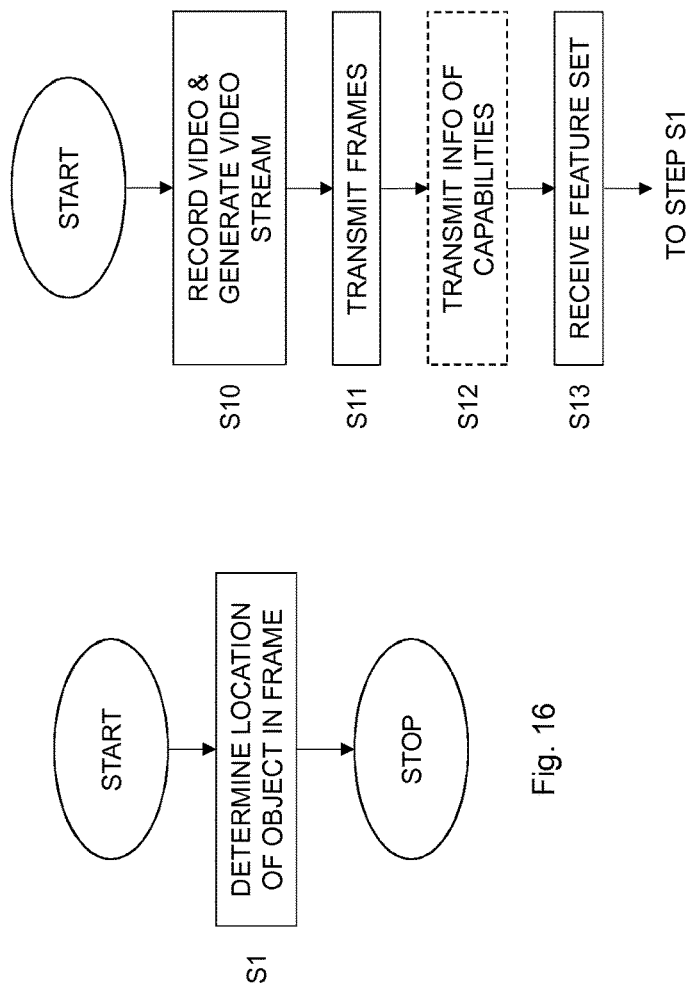
Fig. 17
Fig. 16

OBJECT TRACKING AND DETECTION IN AUGMENTED REALITY APPLICATIONS

PRIORITY

This nonprovisional application is a U.S. National Stage Filing under 35 U.S.C. § 371 of International Patent Application Serial No. PCT/EP2018/060727 filed Apr. 26, 2018 and entitled "OBJECT TRACKING AND DETECTION IN AUGMENTED REALITY APPLICATIONS" which is hereby incorporated by reference in its entirety.

TECHNICAL FIELD

The present embodiments generally relate to object tracking and detection, and in particular to such object tracking and detection in connection with augmented reality.

BACKGROUND

Augmented reality (AR) is a direct or indirect live view of a physical, real-world environment whose objects are augmented, i.e., perceptually enriched, by computer-generated perceptual information. The overlaid perceptual information can be constructive, i.e., additive to the natural environment, or destructive, i.e., masking of the natural environment.

An increasing number of AR applications for user devices, such as smart phones and tablets, have been developed to overlay virtual objects on the real-world view. The core technological challenges in such applications are:
1) identifying real-world objects and their positions on the screen, typically denoted object detection (OD) or object recognition in the art;
2) tracking objects of interest, typically denoted object tracking (OT) in the art; and
3) augmenting the scene with artificial objects, labels, or other types of perceptual information.

Some of the best solutions in the area of OD are considered to be based on Deformable Part Models (DPM) with Histogram of Oriented Gradients (HOG) features. In the last years, even more accurate solutions based on Convolutional Neural Network (CNN) technology are being considered as state of the art in the area. These solutions very accurately detect objects in a given video frame or image, but require significant processing power to operate in real-time. Therefore, CNNs typically run on servers equipped with modern Graphics Processing Units (GPUs) with large amount of memory. These servers deploy large offline-trained models, built on several hundred of thousand or million of labeled video frames or images.

Contrary to OD, most OT solutions are based on lightweight algorithms that can run on the client side, i.e., in a user device, such as a smart phone or tablet. These OT solutions are capable of tracking a previously detected object over video frames, i.e., determine the location of the object over time. OT algorithms typically perform a matching of a representation of an object model built from the previous video frame(s) with representations retrieved from the current video frame. In that sense, OTs have no a-priori knowledge about the tracked objects and variations in their appearance.

In the context of augmented reality, OD does not have the temporal consistency of OT, and at the same time OT does not have the extensive knowledge of the offline-trained model.

Accordingly, the most effective AR solutions today use a combination of OT implemented in a user device 1 and OD implemented in an OD server 5 as shown in FIG. 1. The user device 1 captures a video stream or sequence using a camera 3. The captured video or video frames extracted from the video stream are sent to the OD server 5 for OD. The OD server 5 transmits a response comprising information about the object classes or types of the detected objects, such as car, pedestrian, house, etc., and locations of the detected objects in the video frames. The objection location is then used by the user device 1 to (re)initialize the OT, and the object class is used for the augmentation on the video stream.

The above-presented and in FIG. 1 shown client-server architecture addresses the challenges regarding complexity in AR applications. The user device 1 has limited memory and computational power. Accordingly, the OD is run on the server side and the location and object class of all detected objects are transmitted back to the user device 1, where the comparatively lightweight OT is executed.

This prior art AR solution still has problems and shortcomings. As an example, if the OD server 5 provides an update with object class and location to the user device 1 every few seconds, there will be time intervals in which the OT may lose the object due to rapidly changing appearance. For example the object may be rapidly turning, the lightning conditions may change, and/or the object becomes partially occluded, etc. Accordingly, the AR solution illustrated in FIG. 1 is as reliable as the frequency of updates from the OD server 5. This poses extreme requirements on the network and OD processing time, which could be met only in very specific conditions.

SUMMARY

It is a general objective to provide an improved object tracking and detection for augmented reality. This and other objectives are met by embodiments as disclosed herein.

An aspect of the embodiments relates to an object tracking (OT) device for augmented reality. The OT device is configured to determine a location of an object in a current frame of a video stream based on object feature representations extracted from different locations in the current frame and object feature representations belonging to a model of the object. The model comprises at least one object feature representation extracted from at least one previous frame of the video stream and at least one object feature representation from a feature set. This feature set comprises at least one server-generated object feature representation of objects belonging to a same object class as the object.

A related aspect of the embodiments defines an OT device for augmented reality. The OT device comprises an object tracking module for determining a location of an object in a current frame of a video stream based on object feature representations extracted from different locations in the current frame and object feature representations belonging to a model of the object. The model comprises at least one object feature representation extracted from at least one previous frame of the video stream and at least one object feature representation from a feature set. This feature set comprises at least one server-generated object feature representation of objects belonging to a same object class as the object.

Another aspect of the embodiments relates to an object detection (OD) server for augmented reality. The OD server is configured to determine an object class of an object in a frame of a video stream originating from a user device. The OD server is also configured to retrieve at least one object feature representation from a pre-trained model comprising object feature representations of objects belonging to the object class. The OD server is further configured to transmit information of the object class and a feature set comprising the at least one retrieved object feature representation to the user device.

A related aspect of the embodiments defines an OD server for augmented reality. The OD server comprises an object classifying module for determining an object class of an object in a frame of a video stream originating from a user device. The OD server also comprises a retrieving module for retrieving at least one object feature representation from a pre-trained model comprising object feature representations of objects belonging to the object class. The OD server further comprises a data providing module for providing information of the object class and a feature set comprising the at least one retrieved object feature representation for transmission to the user device.

A further aspect of the embodiments relates to an object tracking method for augmented reality. The method comprises determining a location of an object in a current frame of a video stream based on object feature representations extracted from different locations in the current frame and object feature representations belonging to a model of the object. The model comprises at least one object feature representation extracted from at least one previous frame of the video stream and at least one object feature representation from a feature set. This feature set comprises at least one server-generated object feature representation of objects belonging to a same object class as the object.

Yet another aspect of the embodiments relates to an object detection method for augmented reality. The method comprises determining an object class of an object in a frame of a video stream originating from a user device. The method also comprises retrieving at least one object feature representation from a pre-trained model comprising object feature representations of objects belonging to the object class. The method further comprises transmitting information of the object class and a feature set comprising the at least one retrieved object feature representation to the user device.

A further aspect of the embodiments relates to a computer program comprising instructions, which when executed by at least one processor, cause the at least one processor to determine a location of an object in a current frame of a video stream based on object feature representations extracted from different locations in the current frame and object feature representations belonging to a model of the object. The model comprises at least one object feature representation extracted from at least one previous frame of the video stream and at least one object feature representation from a feature set. This feature set comprises at least one server-generated object feature representation of objects belonging to a same object class as the object.

Yet another aspect of the embodiments relates to a computer program comprising instructions, which when executed by at least one processor, cause the at least one processor to determine an object class of an object in a frame of a video stream originating from a user device. The at least one processor is also caused to retrieve at least one object feature representation from a pre-trained model comprising object feature representations of objects belonging to the object class. The at least one processor is further caused to provide information of the object class and a feature set comprising the at least one retrieved object feature representation for transmission to the user device.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The proposed technology generates and uses a feature set to improve the object tracking performance. The feature set comprises additional object feature representations that can be used in the object tracking. The additional object feature representations can even be of object appearances yet unseen in the particular video stream. The object feature representations of the feature set can then be used to handle object tacking also in changing conditions, such as when the object is rapidly moving or turning or when the lighting conditions quickly changes. This relaxes the need for frequent object detection updates and enables implementation of augmented reality in a large variety of applications and devices, which were previously prohibited by network latency and processing requirements.

BRIEF DESCRIPTION OF THE DRAWINGS

The embodiments, together with further objects and advantages thereof, may best be understood by making reference to the following description taken together with the accompanying drawings, in which:

FIG. 7 is a block diagram of an object tracking device according to another embodiment;

FIG. 8 is a block diagram of an object detecting server according to another embodiment;

FIG. 11 schematically illustrate a computer program based implementation of an embodiment;

FIG. 12 is a block diagram of an object tracking device according to yet another embodiment;

FIG. 13 is a block diagram of an object detecting server according to yet another embodiment;

FIG. 16 is a flow chart of an object tracking method according to an embodiment;

FIG. 17 is a flow chart illustrating additional, optional steps of the method shown in FIG. 16 according to an embodiment;

FIG. 18 is a flow chart illustrating additional, optional steps of the method shown in FIG. 17 according to an embodiment;

DETAILED DESCRIPTION

Throughout the drawings, the same reference numbers are used for similar or corresponding elements.

The present embodiments generally relate to object tracking and detection, and in particular to such object tracking and detection in connection with augmented reality.

Figure 1:
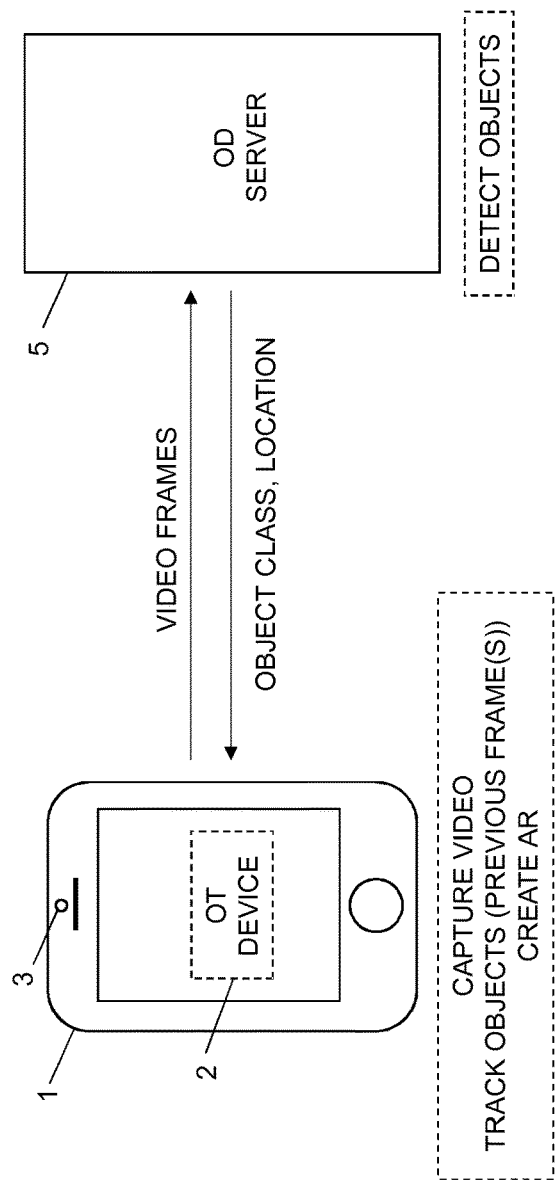
FIG. 1 is an overview of a prior art client—server architecture with object tracking in the user device and object detection in the server.

The prior art client—server architecture for augmented reality shown in FIG. 1 has an inherent trade-off in terms of the frequency of updates of information from the OD server 5 and accuracy of the object tracking. Thus, in order to achieve an accurate OT at the user device 1, in particular when the tracked objects may rapidly change in appearance, it is desired to receive frequent information updates from the OD server 5. However, such frequent information updates in turn requires the objection detection in the OD server 5 to process received video frames and generate information of object classes and locations in a very short period of time. Accordingly, the OD server 5 then needs to have access to extensive processing power in terms of GPUs. Furthermore, each such information update involves transmission of a lot of information over the network between the OD server 5 and the user device 1. Delays, congestions and retransmissions over the network may significantly deteriorate the OT at the user device 1 due to receiving update information from the OD server 5 that is no longer accurate and up-to-date. Accordingly, in practical applications the requirements of the OD server 5 and the network can only be met in very specific conditions, thereby limiting the everyday use of augmented reality applications based on a client-server architecture.

The sensitivity of latency problems in updates from the OD server 5 and the high requirements on the network associated with frequent updates from the OD server 5 are addressed and solved by the present embodiments. According to the embodiments, the OD server 5 generates and transmits a so-called feature set to the user device 1, see FIG. 2, preferably in addition to the object class and location. This feature set comprises server-generated object feature representations of objects, i.e., object feature representations generated by or at least accessible for the OD server 5. The server-generated object feature representations can be used by an OT device 2 in the user device 1 in order to improve the accuracy of the object tracking. In other words, the OT device 2 at the user device 1 is then no longer limited to perform the object tracking based solely on object feature representations extracted for previous video frame(s) but also object feature representations from the feature set provided by the OD server 5. This feature set can include object feature representations of object appearances yet unseen in the video stream and may therefore better describe new or future appearances of the object following, for instance, rapidly turning objects, changes in lightning conditions, object occlusion, etc. In other words, the object feature representations of the feature set can be representations of various instances or appearances of the objects, including different sizes, from different angles, at different lightning conditions, partially occluded, etc. This means that the object feature representations of the feature set may even be appropriate representations of object appearances and instances that have not yet appeared or occurred in the video stream but may be present in future video frames. These object feature representations thereby enable tracking of objects at the user device 1 and in the OT device 2 also when there are rapid changes in the appearance or conditions of the tracked object. Such an object tracking would otherwise be hard or even impossible when merely using object feature representations extracted from previous frame(s) of the video stream and thereby only representing past appearances and instances of the object already seen in the video. The user device 1 and OT device 2 of the present embodiments are less dependent on frequent updates from the OD server 5 as compared to the prior art situation illustrated in FIG. 1.

An aspect of the embodiments relates to an object tracking device 2 for augmented reality. The object tracking device 2, or OT device 2 for short, is configured to determine a location of an object in a current frame 10 of a video stream based on object feature representations extracted from different locations in the current frame 10 and object feature representations belonging to a model of the object, see FIG. 4. The model comprises at least one object feature representation extracted from at least one previous frame 20 of the video stream and at least one object feature representation from a feature set. This feature set comprises at least one server-generated object feature representation of objects belonging to a same object class as the object.

Figure 4:
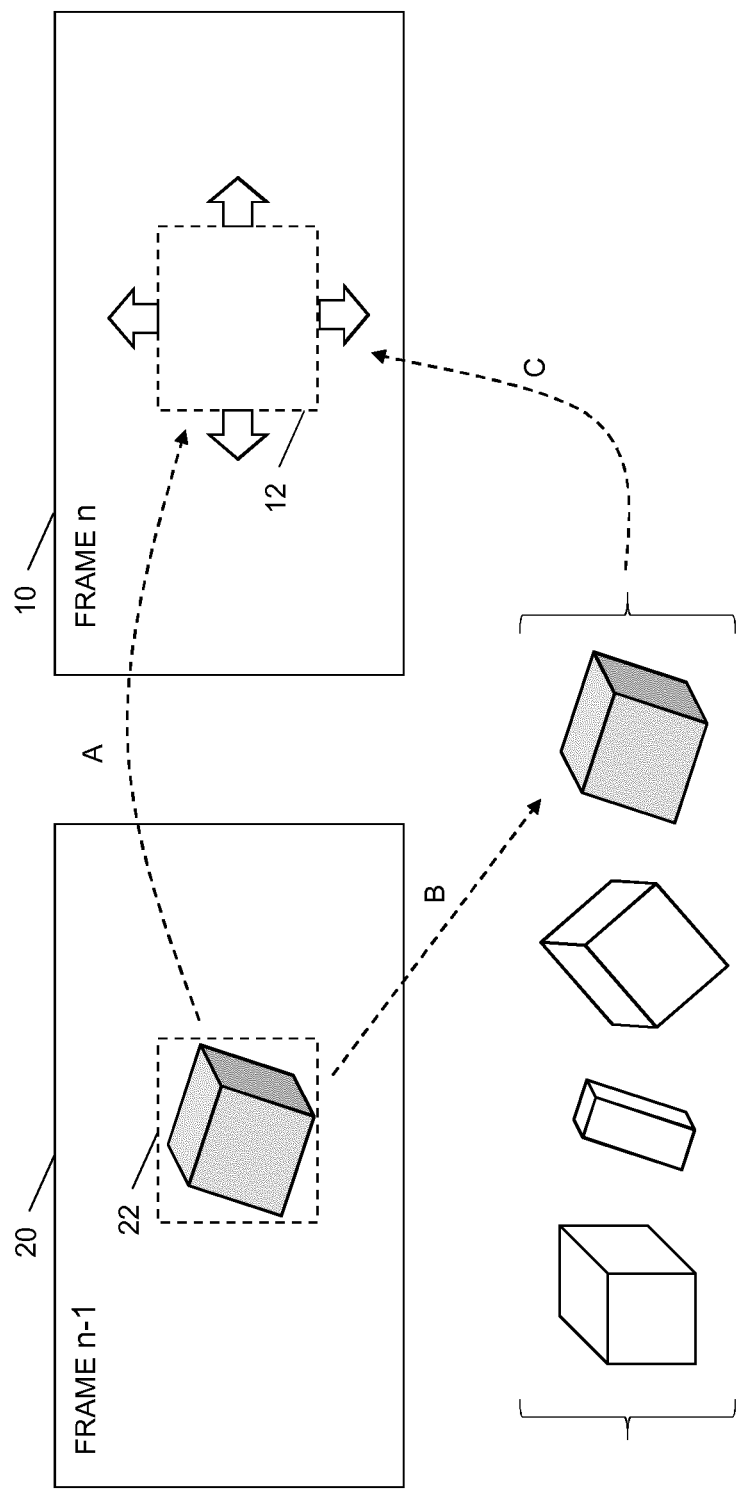
FIG. 4 schematically illustrates usage of object feature representations from a feature set in object tracking.

The lower panel in brackets of FIG. 4 schematically illustrates the concept of having a model that comprises object feature representations not only extracted from at least one previous frame 20, represented by the object in gray, but also server-generated object feature representations, represented by the three objects in white. The OT device 2 may therefore use the full set of object feature representations, both based on previously detected or tracked objects in the video stream and server-generated object feature representations that may cover yet unseen, in the video stream, instances and appearances of the object. This means that the accuracy of the object tracking by the OT device 2 will improve since the OT device 2 may handle also sudden or rapidly changing conditions and appearances of the tracked object in the video stream.

The prior art situation of FIG. 1 would imply that the model shown in the lower panel in brackets of FIG. 4 would only include the object feature representation represented by the object in gray and extracted from at least one previous frame 20 of the video stream. The object feature representations extracted from previous frame(s) 20 are often poor basis for object tracking in the case of rapidly moving or turning objects or rapid changes in the conditions, such as due to lightning changes or object occlusions. The server-generated object feature representations may then constitute a better basis for the object tracking done in the OT device 2.

The model may comprise one object feature representation extracted from at least one previous frame 20 in the video stream or multiple, i.e., at least two, object feature representations extracted from at least one previous frame 20. Correspondingly, the model may comprise one server-generated object feature representation extracted from the feature set or multiple server-generated object feature representations extracted from the feature set.

In an embodiment, explained with reference to FIGS. 2 and 4, the OT device 2 is configured to determine a bounding box representation for the object based on the object feature representations extracted from different locations in the current frame 10 and the object feature representations belonging to the model of the object. The bounding box representation defines a coordinate for a bounding box 12 enclosing the object in the current frame 10 and a size of the bounding box 12.

The bounding box representation may, for instance, be in the form of a vector defining a coordinate of the bonding box 12 and a size of the bonding box 12. The coordinate $(x_n,y_n)$ could be any coordinate that allows identification of the position of the bonding box 12 in the current frame 10. The coordinate could, for example, represent the center of the bounding box 12 or one of the corners of the bounding box 12. The size of the bounding box 12 could be defined by a width $(w_n)$ and a height $(h_n)$ of the bounding box 12 as an illustrative, but non-limiting, example. Hence, in an embodiment the bounding box representation could be in the form of $B_n=[x_n,y_n,w_n,h_n]$. In an alternative embodiment, the bounding box representation could include coordinates of opposite corners of the bounding box 12, i.e., $B_n=[x1_n,y1_n,x2_n,y2_n]$.

The object tracking performed by the OT device 2 could therefore be defined by the mapping $B_n=f(I_n,M_n,B_{n-p})$ from a previous representation $B_{n-p}$, such as $B_{n-1}$, of a bounding box 22 into the representation $B_n$ of the bonding box 12 in the current frame $I_n$ 10 given the model $M_n$ of the object, $p \in [1,n]$.

In an embodiment, explained with reference to FIGS. 2 and 4, the OT device 2 is configured to determine $$B_n = \underset{B^*,m}{\mathrm{argmax}}\, d(X_n(B^*), X_m).$$

In this embodiment, $B_n$ indicates the bounding box representation for the object, $d(\ )$ indicates a similarity measure representing a similarity between object feature representations, $X_m$ indicates an object feature representation belonging to the model of the object, and $X_n(B^*)$ indicates an object feature representation extracted from location $B^*$ in the current frame 10.

This embodiment thereby corresponds to a mapping $f(\ )$ that searches for the best match between object feature presentations extracted from different locations in the current frame 10, represented by the arrows of the bounding box 12 in FIG. 4, and the closest object feature representation from the model $M_n$.

A typical implementation of the OT would be to start from the same coordinate and size of the bounding box 12 in the current frame 10 as the bounding box 22 in a previous frame 20, preferably the most previous frame 20, which is schematically illustrated by the hatched arrow A in FIG. 4. Object feature representations are then extracted from this initial location of the bounding box 12 and compared to the object feature representations from the model, which is schematically illustrated by the hatched arrow C. Further locations of the bounding box 12 are then tested in the current frame 10 as shown by the four arrows, and for each such new location of the bounding box 12, object feature representations are extracted from the new location of the bounding box 12 and compared to the object feature representations from the model. Then the location of the bounding box 12 resulting the largest similarity measure is selected as the location of the tracked object in the current frame 10.

In an embodiment, explained with reference to FIG. 4, the model $M_n$ of the object is selected from the group consisting of $\{X_0, Y_1, Y_2, \ldots, Y_K\}$, $\{X_{n-1}, Y_1, Y_2, \ldots, Y_K\}$, and $\{X_{n-1}, X_{n-2}, \ldots, X_{n-T}, Y_1, Y_2, \ldots, Y_K\}$. In this embodiment, $X_0$ indicates an object feature representation extracted from an initial frame $I_0$ of the video stream, $X_{n-1} \ldots X_{n-T}$ indicates an object feature representation extracted from previous frames $I_{n-1} \ldots I_{n-T}$ 20 of the video stream with regard to the current frame $I_n$ 10, T is an integer equal to or larger than two. Furthermore, $Y_1 \ldots Y_K$ indicates a server-generated object feature representation from the feature set, and K is an integer equal to or larger than one.

In this particular embodiment, the model $M_n$ of the object comprises at least one object feature representation extracted from at least one previous frame 20 in the video stream. In a first example, the at least one object feature representations is extracted from the initial or first frame $I_0$ of the video stream. In a second example, at least one object feature representation is extracted from the most previous frame $I_{n-1}$ 20 in the video stream as shown in FIG. 4. The figure illustrates this concept by the hatched arrow B indicating that the object feature representation extracted from the most previous frame 20 is included in the model $M_n$. In a third example, the model $M_n$ comprises object feature representations extracted from multiple T, i.e., at least two, previous frames 20 in the video stream 10. In a preferred embodiment of this example, the T previous frames 20 are the T most previous frames $I_{n-1} \ldots I_{n-T}$ 20 in the video stream with regard to the current frame $I_n$ 10.

Further examples could be a combination of any of the above three presented examples, such as having a model $M_n$ comprising object feature representation(s) extracted from the initial frame $I_0$ in addition to object feature representation(s) extracted from the most previous frame $I_{n-1}$ 20 or extracted from the T most previous frames $I_{n-1} \ldots I_{n-T}$ 20 in the video stream.

In the above presented examples, the model $M_n$ also comprises at least one server-generated object feature representation from the feature set. FIG. 4 illustrates this concept by having a model $M_n = \{X_{n-1}, Y_1, Y_2, Y_3\}$, i.e., an object feature representation extracted from the most previous frame 20 and three server-generated object feature representations from the feature set.

The complexity of the object tracking performed by the OT device 2 mainly depends on the size of the model $M_n$, i.e., based on the values of the parameters T, K. Generally, the value of the parameter T is pre-defined and fixed for the particular object tracking algorithm used by the OT device 2. Thus, the complexity of the object tracking could be selected and adjusted based on, for instance, the capabilities of the OT device 2 by varying the parameter K, i.e., the number of server-generated object feature representations from the feature set to include in the model $M_n$.

The particular type of object feature representations of the model depends on the type of object tracking algorithm that the OT device 2 uses. For example, an object tracking algorithm could use color histograms of objects. In such a case, the object feature representations could be calculated as cluster centroids of color histograms. Further examples include object feature representations based on Histogram of Oriented Gradients (HOG) features, Speeded Up Robust Features (SURF), Local Binary Patterns (LBP), or indeed any other color, texture and/or shape descriptors.

In a particular embodiment, the object feature representations $X_i$, $Y_j$ are feature vectors for the objects. In such a particular embodiment, the feature vectors could be represented by a mean or average feature vector $\mu_i$, $\mu_j$ and its variance $\Sigma_i$, $\Sigma_j$, i.e., $X_i = \{\mu_i, \Sigma_i\}$, $Y_j = \{\mu_j, \Sigma_j\}$.

The OT device 2 could use any object tracking algorithm or application in order to track objects between frames 10, 20 of a video stream for augmented reality. A non-limiting, but illustrative, example of such an object tracking algorithm is disclosed in Henriques et al., High-Speed Tracking with Kernelized Correlation Filters, *IEEE Transactions on Pattern Analysis and Machine Intelligence*, 2015, 37(3): 583-596.

The OT device 2 of the present embodiments, however, has access to and can thereby use, in the object tracking, object feature representations not only extracted from previous frame(s) 20 in the video stream but also server-generated object feature representations.

The server-generated object feature representations from the feature set are additional representations that can be used by the OT device 2 of objects belonging to the same object class as the tracked object. Thus, the object detection done at the OD server 5 determines not only the location of an object in a frame but also the class or type of the object. Such an object class could define the object as, for instance, car pedestrian, house, etc.

The server-generated object feature representations obtained from the OD server 5 in the feature set and included in the model as described above are preferably representations of objects belonging to the same class as the tracked object. This prevents inclusion of, for instance, object feature representations of cars during tracking of, for instance, a house.

Figure 3:
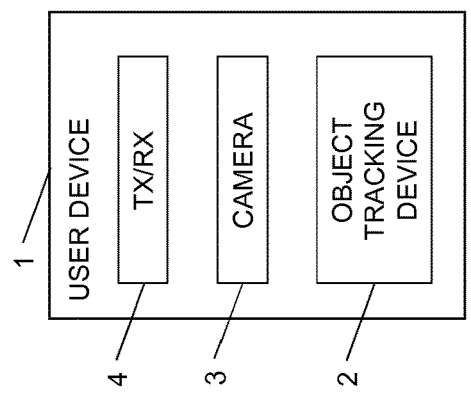
FIG. 3 is a schematic block diagram of a user device according to an embodiment.

Another aspect of the embodiments defines a user device 1, see FIG. 3. The user device 1 comprises an OT device 2 according to the embodiments. The user device 1 also comprises a camera 3 configured to record video and generate the video stream. The user device 1 further comprises a transmitter 4 configured to transmit frames of the video stream to an OD server 5 and a receiver 4 configured to receive the feature set from the OD server 5.

The user device 1 may have a transmitter (TX) 4 and a receiver (RX) 4, or the transmitting and receiving functionalities can be implemented in a combined transceiver as schematically illustrated in FIG. 3. Transmitter and receiver 4 as used herein include any device, module and/or functionality that can be used by the user device 2 to transmit and receive data, respectively, regardless of whether the data communication is performed wirelessly or using wired connections.

Transmission of frames of the video stream by the transmitter 4 could be in the form of transmitting individual frames extracted from the video stream, such as transmitting a single frame, several individual frames or a range of successive frames extracted from the video stream generated by the camera 3. These frames could be transmitted in an uncoded or uncompressed format, or as encoded or compressed frames. Alternatively, the transmitter 4 could transmit or rather stream the video recorded by the camera 3 to the OD server 5, i.e., does not necessarily have to extract and transmit frames from the video stream. The video streamed by the transmitter 4 to the OD server 5 could be in uncoded or uncompressed format, or as an encoded or compressed video stream.

Accordingly, transmission of frames as used herein includes transmission of extracted video frame(s) and transmission or streaming of recorded video.

In an embodiment, explained with reference to FIGS. 2 and 3, the transmitter 4 is configured transmit information of capabilities of the user device 1. The receiver 4 is then configured to receive the feature set generated by the OD server 5 based on the information of the capabilities of the user device 1.

In this embodiment, the user device 1 informs the OD server 5 of its capabilities. The capabilities could include processing power, storage capabilities and/or battery power, etc. of the user device 1, and/or of the OT device 2 in the user device 1. The capabilities thereby represent the ability of the user device 1, or rather the OT device 2, to perform the object tracking.

As previously mentioned herein, the complexity of the object tracking is mainly dependent on the number of object feature representations that are included in the model, i.e., the previously mentioned parameters T, K. The OD server 5 can affect this complexity by determining the number of object feature representations to include in the feature set, i.e., by setting the value of the parameter K. Hence, in an embodiment, the OD server 5 provides the server-generated object feature representations of the feature set based on the information of the capability of the user device 1, preferably by determining the value of the parameter K and thereby the number of server-generated object feature representations to provide based on the information, i.e., K=function(capabilities).

Generally, a user device 1 with significant processing power and access to sufficient (battery) power could benefit from a larger feature set, i.e., larger value of the parameter K, as compared to a user device 1 with more limited processing power and/or battery power.

In an embodiment, explained with reference to FIGS. 2, 3 and 4, the receiver 4 is configured to receive the feature set and information of a location of the object in the current frame 10 determined by the OD server 5. The OT device 2 is then configured to compare the determined location of the object with the information of the location of the object determined by the OD server 5. The OT device 2 is also configured to select the location of the object in the current frame 10 based on the information of the location of the object determined by the OD server 5 if a difference between the determined location and the location of the object determined by the OD server 5 exceeds a threshold difference value.

This embodiment relates to the situation with a so-called derailed object. A derailed object is an object, whose location or position the OT device 2 fails to accurately identify or determine in the object tracking. The user device 1 has access to a location of the object in the current frame 10 as determined by the OT device 2 based on object feature representations extracted from different locations in the current frame 10 and object feature representations belonging to the model of the object. The user device 1 has, in this embodiment, also access to a location of the object as determined by and received from the OD server 5. The OT device 2 can then compare these two locations and conclude that the object is a derailed object if the difference between the two locations exceeds the threshold difference value. In such a situation, the OT device 2 should reinitiate the object tracking by selecting the location of the object as determined by the OD server 5. The continuous object tracking in subsequent frames of the video stream starts from this server-determined and notified location.

The transmitter 4 of the user device 1 is preferably also configured to transmit, to the OD server 5, a notification that the object is a derailed object if the difference exceeds the threshold value.

However, if the difference does not exceed the threshold difference value, then the OT device 2 has not lost track of the object, and the object is not derailed. The OT device 2 could then use any of the locations in the subsequent object tracking, i.e., either use the location as determined and received from the OD server 5 or the location as determined by the OT device 2 itself.

Figure 2:
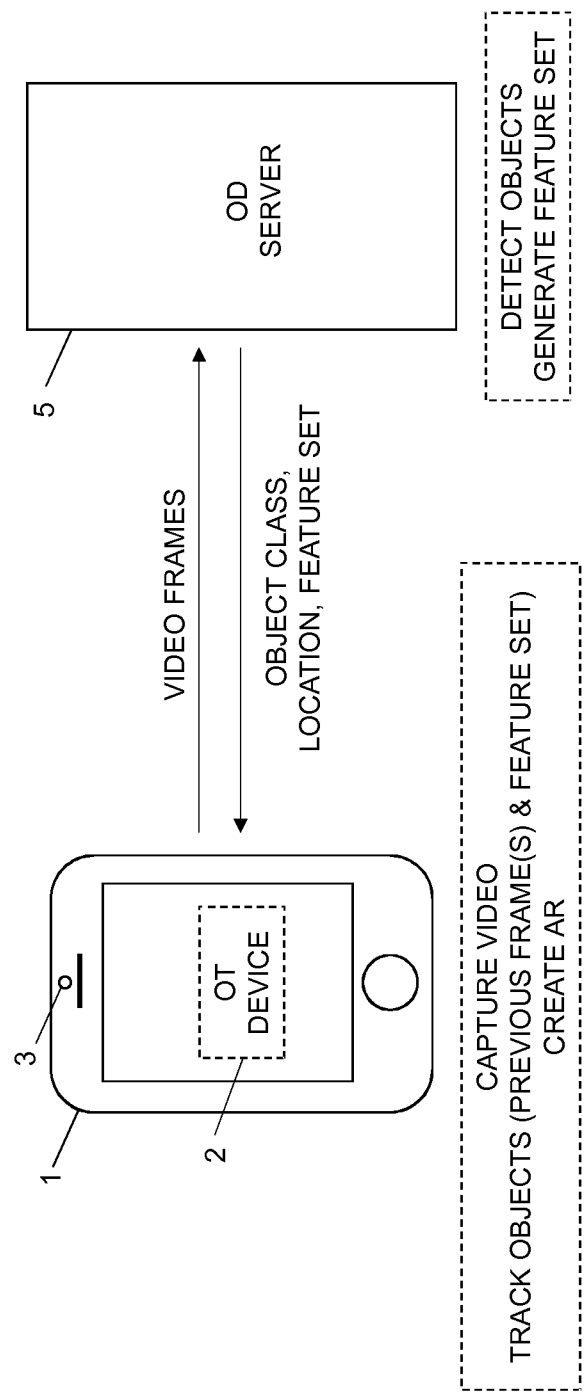
FIG. 2 is an overview of a client—server architecture with object tracking in the user device and object detection in the server according to an embodiment.

A further aspect of the embodiments relates to an OD server 5 for augmented reality, see FIGS. 2 and 4. The OD server 5 is configured to determine an object class of an object in a frame 10 of a video stream originating from a user device 1. The OD server 5 is also configured to retrieve at least one object feature representation from a pre-trained model comprising object feature representations of objects belonging to the object class. The OD server 5 is further configured to transmit information of the object class and a feature set comprising the at least one retrieved object feature representation to the user device 1.

Thus, the OD server 5 is configured to receive video frames from the user device 1 as shown in FIG. 2 in order to perform an object detection of at least one object in the video frames. This object detection includes determining an object class of the object in a frame of the video stream. As previously mentioned herein, objects are, in the field of AR, classified into different object types of classes, such as car, pedestrian, house, etc. The object class is according to the embodiments not only notified to the user as shown in FIG. 2 but also used to retrieve object feature representations from the pre-trained model. These object feature representations that are retrieved by the OD server 5 are of objects belonging to the same object class as the object, i.e., as determined by the OD server 5. The OD server 5 then has access to a pre-trained model comprising the object feature representations of objects belonging to this object class. The OD server 5 retrieves all or a portion of these object feature representations from the pre-trained model and transmits them as a feature set to the user device 1 in addition to the information of the determined object class.

In an embodiment, explained with reference to FIGS. 2 and 4, the OD server 5 is configured to compare the determined object class with any previously determined object classes for at least one previous frame of the video stream. In this embodiment, the OD server 5 is also configured to retrieve the at least one object feature representation from the pre-trained model if the determined object class is different from the any previously determined object class.

Thus, in this embodiment, the OD server 5 first verifies whether the determined object class is the same as an object class that has previously been determined by the OD server 5 for at least one previous frame 20 of the video stream. This means that the object, or another object belonging to the same object class, has already been detected by the OD server 5. Furthermore, the OD server 5 has then already retrieved object feature representations from the pre-trained model for that object class and sent them as a feature set to the user device 1. Accordingly, the feature set with retrieved object feature representation(s) does not need to be transmitted anew to the user device 1.

Therefore, in a preferred embodiment, the OD server 5 retrieves and transmits object feature representations to the user device 1 in connection with, and more preferably only in connection with, the first detection of an object for a given object class. This means that when the OD server 5, at a later frame, detects the same object or another object belonging to the given object class, the OD server 5 does not need to retrieve any object feature representations nor transmit them to the user device 1 since the user device 1 has already got the feature set with object feature representations for the given object class in connection with the first detection of an object for the given object class. This embodiment thereby reduces the processing taking place at the OD server 5 and also reduces the amount of data that is transmitted to the user device 1 in response to received video frames.

Although it is generally preferred and sufficient to transmit the feature set with object feature representations only once for a given object class to the user device 1, the OD server 5 may transmit or retransmit the feature set at each transmission occasion for which the OD server 5 has detect an object for the given object class, or at least for some of these transmission occasions. For instance, the OD server 5 can be configured to transmit the feature set at each $N^{th}$ transmission occasion to the user device 1 for some value of the parameter N. This may in particular be advantageous if the OD server 5, in real-time or at least during the current communication session with the user device 1, updates the server-generated object feature representations, such as by training or updating the pre-trained model, which is further described below. Another situation, in which it may be advantageous to (re)transmit the feature set is when the server-generated object feature representations of the feature set should be updated, such as based on contextual information and using different weights or biases for different server-generated object feature representations. Thus, the most appropriate server-generated object feature representations for a given object class may change over time as the OD server 5 receives more and more frames of the video stream. This embodiment is in particular advantageous in connection with a contextual adaptation of the server-generated object feature representations of the feature set, i.e., an adaptation that is based on the past video content of the video stream.

In an embodiment, explained with reference to FIGS. 2 and 4, the OD server 5 is also configured to determine a location of the object in the frame 10 of the video stream in addition to the object class. The OD server 5 is then configured to transmit information of the object class and the location of the object in the frame 10 of the video stream, and the feature set to the user device 1 as indicated in FIG. 2.

The location of the object in the video frame 10 is determined by the OD server 5 in an object detection procedure. There are various object detection algorithms available in the art, and that can be used by the OD server 5 to determine the location, such as DPM with HOG features, CNNs, etc. Non-limiting, but illustrative, examples of such object detection algorithms are disclosed in Ren et al., Faster R-CNN: Towards Real-Time Object Detection with Region Proposal Networks, *IEEE Transactions on Pattern Analysis and Machine Intelligence,* 2017, 39(6): 1137-1149; Redmon and Farhadi, YOLO9000: Better, Faster, Stronger, *IEEE Conference on Computer Vision and Pattern Recognition (CVPR),* 2017; Viola and Jones, Rapid Object Detection using a Boosted Cascade of Simple Features, *Proceedings of the* 2001 *IEEE Computer Society Conference on Computer Vision and Pattern Recognition,* 2001. (*CVPR* 2001), 2001.

The location of the object in the video frame 10 could be in the form of a location of a bounding box 12 enclosing the object in video frame 10. As previously disclosed herein, the location of such a bounding box 12 could be in terms of a coordinate of the bounding box 12, such as coordinate of a center or one of the corners of the bounding box 12, and a size of the bounding box 12, such as width and height of the bounding box 12. Alternatively, coordinates of opposite corners of the bounding box 12 in the video frame 10 could be used to define the location of the bounding box 12.

Actually, any information allowing the user device 10 to identify the location of the object in the video frame 10 and that can be used to initiate or reinitiate the object tracking algorithm of the OT device 2 in the user device 1 can be used according to the embodiments.

In an embodiment, explained with reference to FIG. 2, the OD server 5 is configured to generate the pre-trained model based on a training set of labeled objects by separating the labeled objects in multiple object classes. Each object class of the multiple object classes comprises object feature representations of labeled objects belonging to the object class.

In this embodiment, the OD server 5 takes an offline approach to train and generate the pre-trained model. In a typical example, the OD server 5 has access to several thousands, and more commonly, several ten or hundred thousand, or even several million of labeled objects that are used as a basis for training the model. These objects are labeled, meaning that the object class of each labeled object is known and input into the training algorithm. The OD server 5 then generates object feature representations for the labeled objects in the training set and generates the pre-trained model by separating the labeled objects in multiple object classes.

For instance, the OD server 5 could calculate pre-trained models as cluster centroids of color histograms extracted from the entire training set for a particular object class. Alternatively, the pre-trained model could be based on HOG, SURF, LBP, or any other color, texture and/or shape descriptors.

It is generally preferred to generate the pre-trained model in an offline algorithm since the process of generating pre-trained model for different object classes is a computationally intense process, in particular when having access to a training set of several hundred thousand of labeled objects.

The pre-trained model generated by the OD server 5 may be updated as more labeled objects are available to thereby more accurately separate the labeled objects in the training set into multiple object classes and generate pre-trained models with object feature representations for the multiple object classes.

In another approach, the pre-trained model may be determined offline by a dedicated model-generating server and device. In this approach, once the pre-trained model is generated it becomes available to the OD server 5 to be used in connection with object detection. Hence, the pre-trained model does not necessarily have to be generated by the OD server 5 itself as long as the OD server 5 has access to the pre-trained model.

In another embodiment, explained with reference to FIGS. 2 and 4, the OD server 5 is configured to generate the pre-trained model based on multiple objects detected in frames 10, 20 of at least one video stream originating from at least one user device 1 by separating the detected objects in multiple object classes. Each object class of the multiple object classes comprises object feature representations of detected objects belonging to the object class.

This embodiment involves an inline approach in generating the pre-trained model. The pre-trained model is thereby generated based on object feature representations and object classes determined from video frames 10, 20 received from one or more user devices 1 communicating with the OD server 5. As mentioned above, the OD server 5 performs an object detection on receiving a video frame 10, 20 from a user device 1. As a part of this object detection, the OD server 5 determines object class and object feature representations for objects. The determined object classes and object feature representations may then be input in the inline training of the model in correspondence of using labeled objects in the offline training.

As compared to the offline approach, online training of the model needs to be fast to be run in real-time or near real-time. In addition, online training most often has access to less input data as compared an offline training set with up to several millions of labeled objects. Accordingly, the accuracy of a pre-trained model generated in an offline training is generally higher than a pre-trained mode generated in an inline training.

The two embodiments described above can be combined. Thus, the pre-trained model is then preferably generated offline by the OD server 5 or an external model training sever or device. This pre-trained model may then be updated or further trained based on inline data, i.e., object class and object feature representations determined for video frames 10, 20 received from user devices 1.

In a particular embodiment, the pre-trained model is trained, online or preferably offline, in a discriminative way to separate, in the best way, different classes of objects, typically by means of CNN or support vector machine (SVM). In order to be able to create a feature set, based on the request from the user device 1, the OD server 5 may use a generative model, e.g., Gaussian Mixture Model (GMM), trained with Expectation Maximization (EM) algorithm on the available labeled objects, or previously detected objects. This model captures the statistical distribution of the feature space. In the simplest form, this can be also modeled by means of lookup table with centroids obtained by applying k-mean clustering on object feature representations extracted from the labeled objects. In such case, the OD sever 5 could keep also the size of the clusters.

In an embodiment, explained with reference to FIG. 2, the OD server 5 is configured to retrieve the at least one object feature representation from the pre-trained model based on information of capabilities of the user device 1.

In this embodiment, the OD server 5 receives a notification of the capabilities of the user device 1. The OD server 5 can then generate the feature set based on these capabilities. For instance, the OD server 5 could generate a feature set comprising more object feature representations for a user device 1 having extensive processing capabilities as compared to a feature set generated for a user device 1 with limited processing power.

Due to variations in hardware, computational load from other applications, and/or limited battery power, the user device 1 could send requests for different sizes of feature sets $\{Y_1, Y_2, \ldots, Y_K\}$. This means that the parameter K is determined based on the capabilities of the user device 1. For instance, K=16 when low-complexity is required, or K=128 when the object tracking in the user device 1 runs on more powerful hardware. The generative model at the OD server 5 can create feature sets of different sizes, by selecting the K object feature representations with largest weights (in case of GMM), or clusters with largest number of elements (in case of simple k-mean clustering). This guarantees that the most likely object feature representations are selected, despite of the varying size of the feature set.

In an embodiment, explained with reference to FIG. 2, the pre-trained model comprises the object feature representations of objects belonging to the object class and weights assigned to the object feature representations. In such a case, the OD server 5 may be configured to retrieve the at least one object feature representation from the pre-trained model based on the weights assigned to the object feature representations.

In this embodiment, the object feature representations of the pre-trained model are weighted to reflect estimated relevance of the object feature representations. Thus, an object feature representation in the pre-trained model being associated with a higher weight as compared to another object feature representations is estimated to be of more relevance for the OT device 2 during the object tracking.

The embodiment of assigning weights to object feature representations in the pre-trained model is advantageously used in combination with retrieving object feature representations from the pre-trained model based on information of capabilities of the user device 1. This would then amount to selecting the K object feature representations in the pre-trained model having the largest weight. The user device 1, and the OT device 2 implemented therein, will thereby receive a feature set with the presumed most relevant object feature representations.

Thus, the mechanism for creation of the feature set is based on selecting the most likely object feature representations based on their distribution in the pre-trained model. This means that out of a total set of object feature representations in the pre-trained model $\{\omega_j, Y_j\}_{j=1}^J$ only K object feature representations $Y_j$ with largest weights $\omega_j$ will be selected, $K \in [1,J]$ and typically $K \in [1,J)$.

The above presented approach does not necessarily provide any adaptation to already observed statistics in the particular video stream. As an example, the video scene captured by the user device 1, may exhibit lightning conditions not well represented by the labeled training data available at the OD server 5, e.g., captured under sunset or sunrise. In such case, the weights $\omega_j$ will not be reflecting well the statistics of the particular video stream.

Therefore, in a particular implementation, bias could be introduced towards object feature representations that are "excited", i.e., selected to be closest to already observed appearances of the object in the past frames 20 of the video stream. As an example, every time an object feature representation is selected to be closest to a particular object in a video frame 20, its weight may be increased by a given value and all weights normalized to sum up to one. The same logic could be applied if instead of GMM, a lookup table with cluster centroids and number of elements in a cluster is used. Then a bias could be introduced to the initial number of elements in a cluster by incrementing it every time the centroid is selected to be the closest match to an object feature representation from the already observed frames 20 in the video stream.

Hence, in an embodiment, explained with reference to FIGS. 2 and 4, the OD server 5 is configured to set at least a portion of the weights assigned to the object feature representations based on information of object feature representations retrieved from the pre-trained model for at least one previous frame 20 of the video stream.

Thus, previously selected and retrieved object feature representations are weighted higher as compared to non-selected object feature representations.

In an embodiment, explained with reference to FIG. 2, the OD server 5 is configured to set the weights assigned to the object feature representations to default values based on reception, from the user device 1, of a notification that the object is a derailed object.

When a new object is detected, there is no "context adaptation" and original weights are preferably used to create the feature set at the OD server 5. Then the object tracking is initiated and "context adaptation", such as bias to the weights, is introduced, as described above.

As previously described herein, in an embodiment, the OT device 2 checks for derailed objects, such as at every occasion when information is received from the OD server 5. If a derailed object is detected, the OT device 2 preferably generates a notification thereof and the user device 1 transmits this notification to the OD server 5. In such case, the "context adaptation" is preferably removed and initial weights are used, in the same way as for a newly detected object.

The initial weights could be using the same weight value for all object feature representation, i.e., $$\omega_j = \frac{1}{J}.$$

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 5:
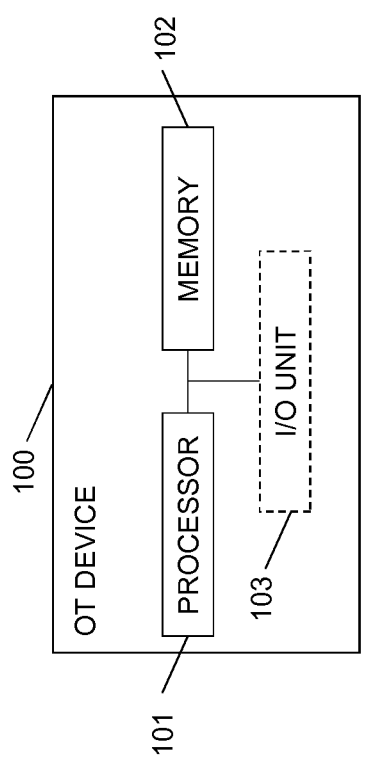
FIG. 5 is a block diagram of an object tracking device according to an embodiment.

FIG. 5 is a schematic block diagram illustrating an example of an OT device 100 according to an embodiment. In this particular example, the OT device 100 comprises a processor 101, such as processing circuitry, and a memory 102. The memory 102 comprises instructions executable by the processor 101.

In an embodiment, the processor 101 is operative to determine the location of the object in the current frame of the video stream based on object feature representations extracted from different locations in the current frame and object feature representations belonging to the model of the object.

Figure 6:
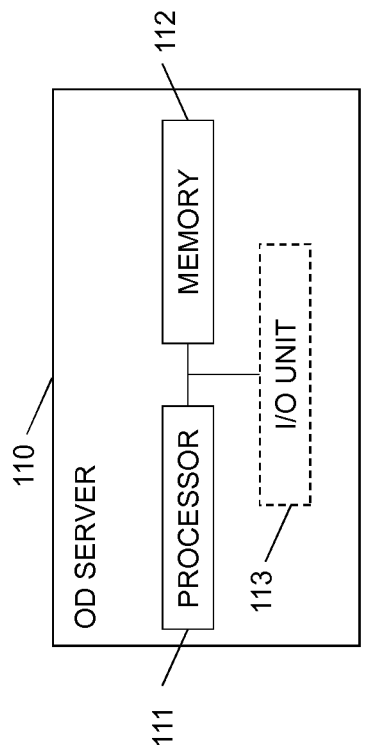
FIG. 6 is a block diagram of an object detecting server according to an embodiment.

FIG. 6 is corresponding schematic block diagram illustrating an example of an OD server 110 according to an embodiment. In this particular example, the OD server 110 comprises a processor 111, such as processing circuitry, and a memory 112. The memory 112 comprises instructions executable by the processor 111.

In an embodiment, the processor 111 is operative to determine the object class of the object in the frame of the video stream. The processor 111 is also operative to retrieve the object feature representations from the pre-trained model and provide the information of the object class and the feature set for transmission to the user device.

Optionally, the OT device 100 and/or the OD server 110 may also include a communication circuit, represented by a respective input/output (I/O) unit 103; 113 in FIGS. 5 and 6. The I/O unit 103; 113 may include functions for wired and/or wireless communication with other devices, servers and/or network nodes in a wired or wireless communication network. In a particular example, the I/O unit 103; 113 may be based on radio circuitry for communication with one or more other nodes, including transmitting and/or receiving information. The I/O unit 103; 113 may be interconnected to the processor 101; 111 and/or memory 102; 112. By way of example, the I/O unit 103; 113 may include any of the following: a receiver, a transmitter, a transceiver, I/O circuitry, input port(s) and/or output port(s).

In an embodiment, the processor 111 is operative to provide the information of the object class and the feature set to the I/O unit 113 for transmission to the user device 1.

FIG. 7 is a schematic block diagram illustrating another example of an OT device 120 and FIG. 8 is a corresponding schematic block diagram illustrating another example of the OD server 130 based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 10:
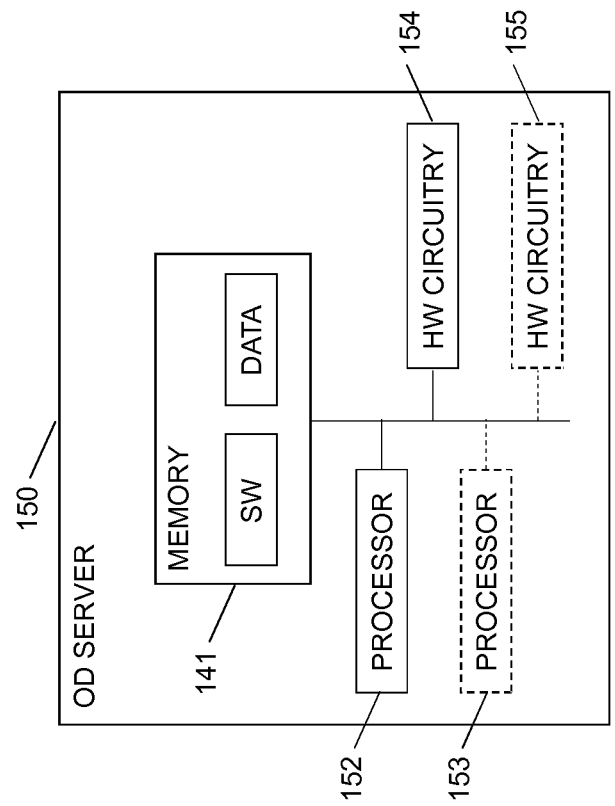
FIG. 10 is a block diagram of an object detecting server according to a further embodiment.
Figure 9:
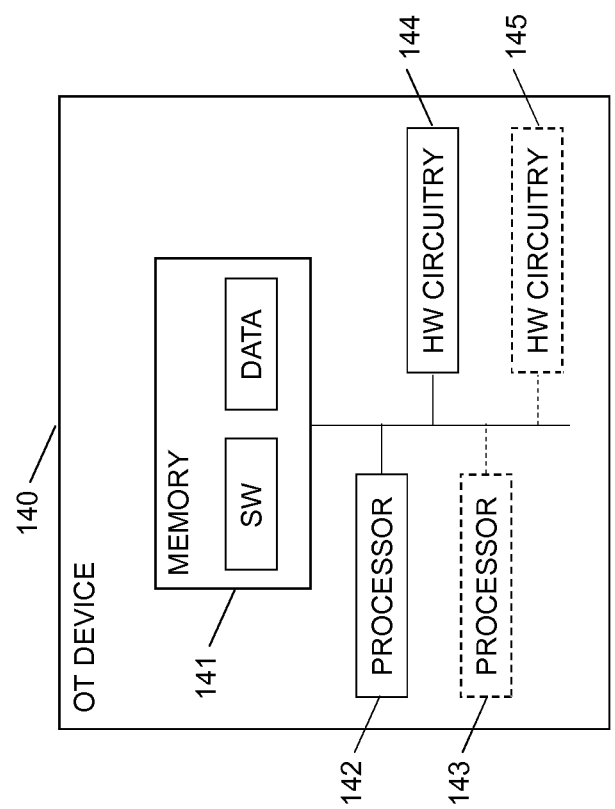
FIG. 9 is a block diagram of an object tracking device according to a further embodiment.

FIGS. 9 and 10 are schematic block diagrams illustrating yet another example of an OT device 140 and OD server 150 based on combination of both processor(s) 142, 143; 152, 153 and hardware circuitry 144, 145; 154, 155 in connection with suitable memory unit(s) 141; 151. The overall functionality is, thus, partitioned between programmed software for execution on one or more processors 142, 143; 152, 153 and one or more pre-configured or possibly reconfigurable hardware circuits 144, 145; 154, 155. The actual hardware-software partitioning can be decided by a system designer based on a number of factors including processing speed, cost of implementation and other requirements.

FIG. 11 is a computer program based implementation of an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as video frames, information of object class and location and feature sets.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processor 210, cause the at least one processor 210 to determine a location of an object in a current frame of a video stream based on object feature representations extracted from different locations in the current frame and object feature representations belonging to a model of the object. The model comprises at least one object feature representation extracted from at least one previous frame of the video stream and at least one object feature representation from a feature set comprising at least one server-generated object feature representation of objects belonging to a same object class as the object.

In another embodiment, the computer program 240 comprises instructions, which when executed by at least one processor 210, cause the at least one processor 210 to determine an object class of an object in a frame of a video stream originating from a user device. The at least one processor 210 is also caused to retrieve at least one object feature representation from a pre-trained model comprising object feature representations of objects belonging to the object class. The at least one processor 210 is further caused to provide information of the object class and a feature set comprising the at least one retrieved object feature representation for transmission to the user device.

In an embodiment, the at least one processor 210 is caused to provide information of the object class and a feature set comprising the retrieved object feature representations to the I/O unit 230 for transmission to the user device.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may, thus, be loaded into the operating memory 220 for execution by the processing circuitry 210.

The flow diagram or diagrams presented herein may be regarded as a computer flow diagram or diagrams, when performed by one or more processors. A corresponding OT device or OD server may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

FIG. 12 is a block diagram of an OT device 160 for augmented reality according to yet another embodiment. The OT device 160 comprises an object tracking module 161 for determining a location of an object in a current frame of a video stream based on object feature representations extracted from different locations in the current frame and object feature representations belonging to a model of the object. The model comprises at least one object feature representation extracted from at least one previous frame of the video stream and at least one object feature representation from a feature set comprising at least one server-generated object feature representation of objects belonging to a same object class as the object.

FIG. 13 is a block diagram of an OD server 170 for augmented reality according to yet another embodiment. The OD server 170 comprises an object classifying module 171 for determining an object class of an object in a frame of a video stream originating from a user device. The OD server 170 also comprises a retrieving module 172 for retrieving at least one object feature representation from a pre-trained model comprising object feature representations of objects belonging to the object class. The OD server 170 further comprises a data providing module 173 for providing information of the object class and a feature set comprising the retrieved at least one object feature representation for transmission to the user device.

The user device can be any user device capable of providing augmented reality services, i.e., comprises the OT device according to any of the embodiments. The user device is advantageously selected from the group consisting of a mobile telephone, a smart phone, a laptop, a computer, a tablet, a game console, a head mounted display and augmented reality glasses.

It is also becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources, such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and NIC(s), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a sets of applications. In an example embodiment, each of the software containers, also called virtualization engines, virtual private servers, or jails, is a user space instance, typically a virtual memory space. These user space instances may be separate from each other and separate from the kernel space in which the operating system is executed. Then, the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, network devices, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level. It should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device. In certain embodiments of such a hybrid network device, a platform Virtual Machine (VM), such as a VM that implements functionality of a special-purpose network device, could provide for para-virtualization to the hardware present in the hybrid network device.

Figure 14:
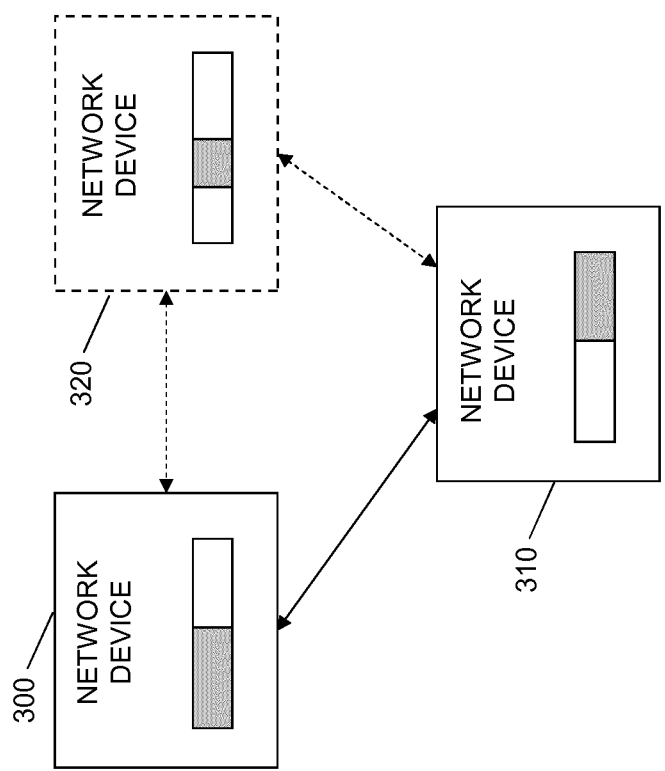
FIG. 14 schematically illustrates a distributed implementation among network devices.

FIG. 14 is a schematic diagram illustrating an example of how functionality can be distributed or partitioned between different network devices in a general case. In this example, there are at least two individual, but interconnected network devices 300, 310, which may have different functionalities, or parts of the same functionality, partitioned between the network devices 300, 310. There may be additional network device 320 being part of such a distributed implementation. The network devices 300, 310, 320 may be part of the same wireless or wired communication system, or one or more of the network devices may be so-called cloud-based network devices located outside of the wireless or wired communication system.

Figure 15:
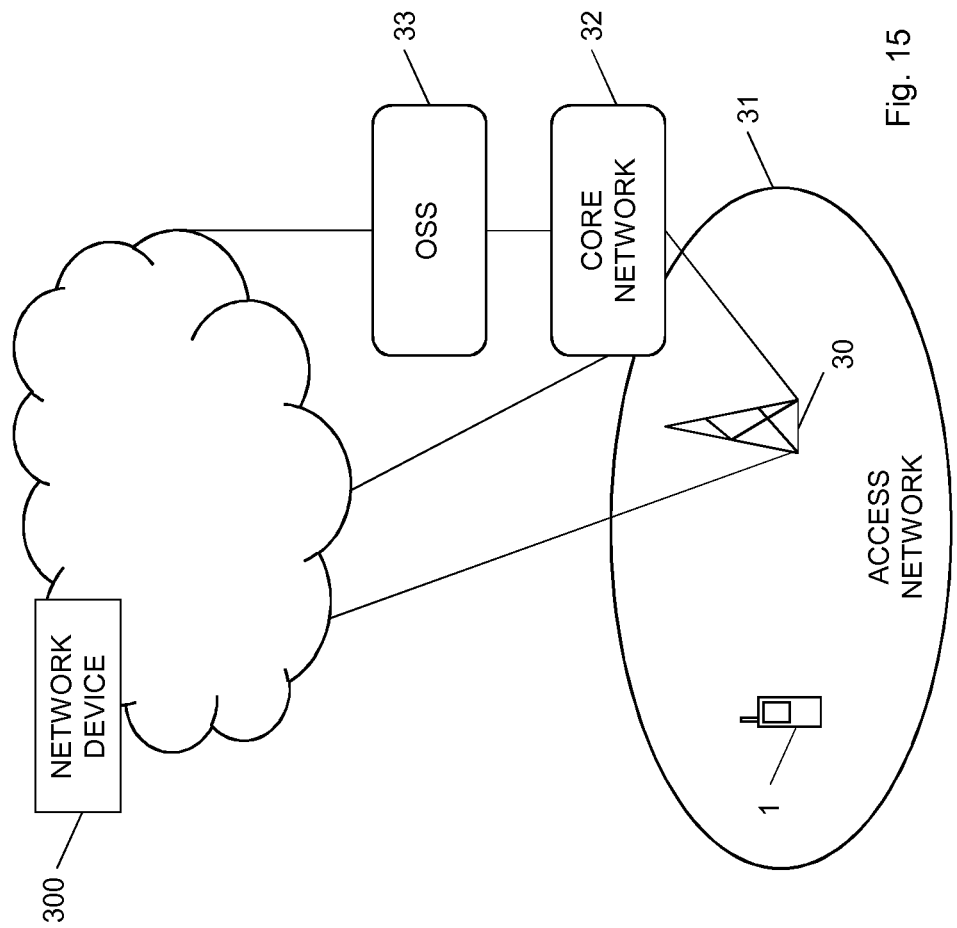
FIG. 15 is a schematic illustration of an example of a wireless communication system with one or more cloud-based network devices according to an embodiment.

FIG. 15 is a schematic diagram illustrating an example of a wireless communication system, including a radio access network (RAN) 31 and a core network 32 and optionally an operations and support system (OSS) 33 in cooperation with one or more cloud-based network devices 300. The figure also illustrates a user device 1 connected to the RAN 31 and capable of conducting wireless communication with a RAN node 30, such as a base station, node B (NB), evolved node B (eNB), next generation node B (gNB), etc.

FIG. 16 is a flow chart illustrating an object tracking method for augmented reality according to an embodiment. The object tracking method is preferably executed in a user device, or in an OT device of a user device.

The method comprises determining, in step S1, a location of an object in a current frame of a video stream based on object feature representations extracted from different locations in the current frame and object feature representations belonging to a model of the object. The model comprises at least one object feature representation extracted from at least one previous frame of the video stream and at least one object feature representation from a feature set comprising at least one server-generated object feature representation of objects belonging to a same object class as the object.

In an embodiment, step S1 of FIG. 16 comprises determining a bounding box representation for the object based on the object feature representations extracted from different locations in the current frame and the object feature representations belonging to the model of the object. In an embodiment, the bounding box representation defines a coordinate for a bounding box enclosing the object in the current frame and a size of the bounding box.

In an embodiment, step S1 of FIG. 16 comprises determining $$B_n = \underset{B^*, m}{\operatorname{argmax}} d(X_n(B^*), X_m),$$

wherein $B_n$ indicates the bounding box representation for the object, d( ) indicates a similarity measure representing a similarity between object feature representations, $X_m$ indicates an object feature representation belonging to the model of the object, and $X_n(B^*)$ indicates an object feature representation extracted from location $B^*$ in the current frame.

FIG. 17 is a flow chart illustrating additional, optional steps of the method shown in FIG. 16 according to an embodiment. These optional steps S10 to S13 are preferably executed in a user device.

The method comprises recording, in step S10, video and generating the video stream. A next step S11 comprises transmitting frames of the video stream to an OD server. This embodiment also comprises receiving, in step S13, the feature set from the OD server. The method then continues to step S1 in FIG. 16, in which the location of the object in the current frame is determined as described herein.

In an optional embodiment, the method also comprises the optional step S12 as indicated in FIG. 17. This step S12 comprises transmitting information of capabilities of the user device to the OD server. In this optional embodiment, step S13 comprises receiving the feature set generated by the OD server based on the information of capabilities of the user device.

In an embodiment, step S13 of FIG. 17 comprises receiving the feature set and information of a location of the object in the current frame determined by the OD server. In this embodiment, the method comprises the further steps as illustrated in FIG. 18. Hence, the method continues from step S13 in FIG. 17 to step S20 in FIG. 18. The optional steps S20 to S23 in FIG. 18 are preferably executed in a user device.

Step S20 comprises comparing the determined location of the object with the information of the location of the object determined by the OD server. If a difference between the determined location and the location of the object determined by the OD server exceeds a threshold difference value as verified in the optional step S21, the method continues to step S22. Step S22 comprises selecting the location of the object in the current frame based on the information of the location of the object determined by the OD server. This corresponds to a situation with a derailed object. Accordingly, the object tracking should then be reinitiated based on the information received from the OD server.

However, if the difference between the determined location and the location of the object determined by the OD server does not exceed the threshold difference value, as verified in the optional step S21, the object tracking has not lost track of the object. Accordingly, the method should then proceed from the optional step S21 to step S1 in FIG. 16.

In an embodiment, the method comprises an optional step S23 in FIG. 18. This step S23 comprises transmitting, to the OD server, a notification that the object is a derailed object if the difference exceeds the threshold difference value.

Figure 19:
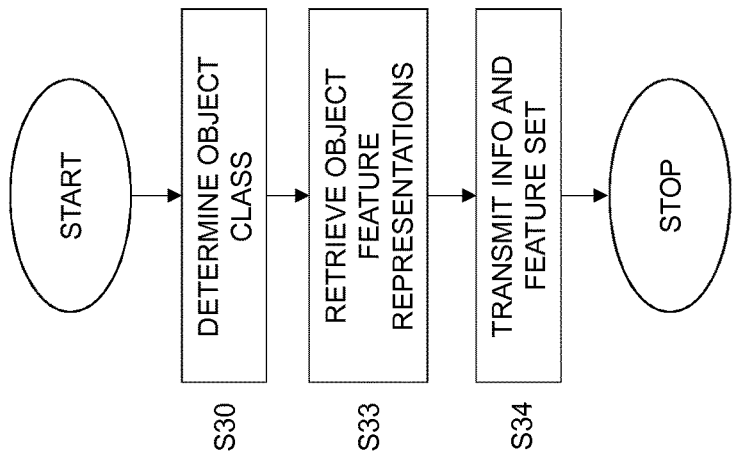
FIG. 19 is a flow chart illustrating an object detecting method according to an embodiment.

FIG. 19 is a flow chart illustrating an object detection method for augmented reality according to an embodiment. The object detection method is preferably executed in an OD server.

The method comprises determining, in step S30, an object class of an object in a frame of a video stream originating from a user device. The method also comprises retrieving, in step S33, at least one object feature representation from a pre-trained model comprising object feature representations of objects belonging to the object class. The method further comprises transmitting, in step S34, information of the object class and a feature set comprising the at least one retrieved object feature representation to the user device.

Figure 20:
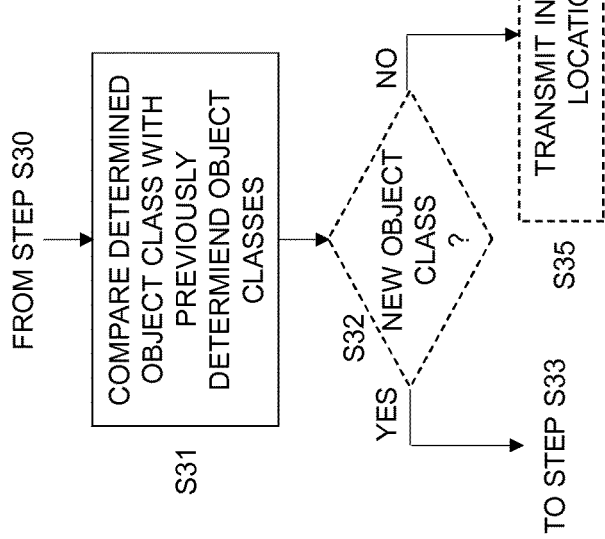
FIG. 20 is a flow chart illustrating additional, optional steps of the method shown in FIG. 19 according to an embodiment.

In an embodiment, the method comprises an additional step S31 as shown in FIG. 20, which is preferably executed in the OD server. The method continues from step S30 in FIG. 19.

Step S31 comprises comparing the determined object class with any previously determined object classes for at least one previous frame of the video stream. If the determined object class is different from the any previously determined object classes the method continues to step S33 in FIG. 19. In this embodiment, step S33 comprises retrieving the at least one object feature representation from the pre-trained model.

Thus, in this embodiment, object feature representation(s) is(are) retrieved and transmitted as a feature set to the user device if the determined object class is a new object class, i.e., no object belonging to this object class has previously been detected in the video stream, as verified in the optional step S32.

If, however, the object class is not new the method preferably continues from the optional step S32 to step S35. This step comprises transmitting information of the determined object class and preferably location of the object to the user device. Hence, no feature set of object feature representations are transmitted in this step S35 as compared to step S34 in FIG. 19.

In an embodiment, step S30 of FIG. 19 comprises determining the object class and a location of the object in the frame of the video stream. In such a case, step S34 preferably comprises transmitting information of the object class and the location of the object in the frame of the video stream, and the feature set to the user device.

Figure 21:
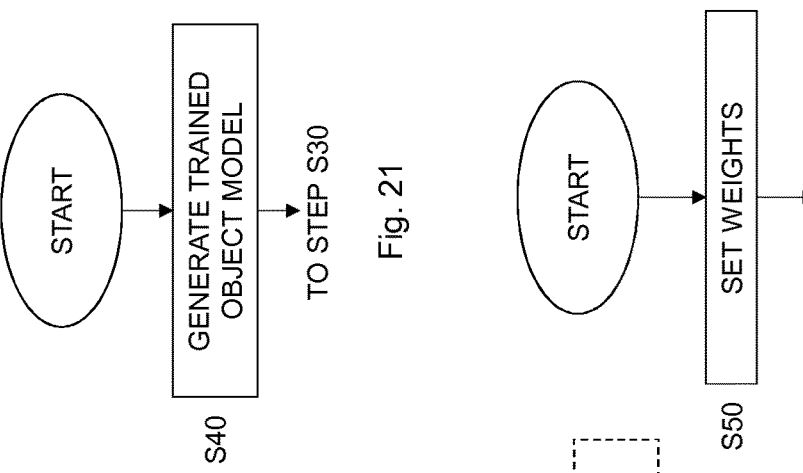
FIG. 21 is a flow chart illustrating an additional, optional step of the method shown in FIG. 19 according to an embodiment.

In an embodiment, the method comprises an additional, optional step S40 as shown in FIG. 21, which is preferably executed in the OD server.

In an embodiment, step S40 comprises generating the pre-trained model based on a training set of labeled objects by separating the labeled objects in multiple object classes, each object class of the multiple object classes comprises object feature representations of labeled objects belonging to the object class. The method then continues to step S30 in FIG. 19.

In another embodiment, step S40 comprises generating the pre-trained model based on multiple objects detected in frames of at least one video stream originating from at least one user device by separating the detected objects in multiple object classes, each object class of the multiple object classes comprises object feature representations of detected objects belonging to the object class. The method then continues to step S30 in FIG. 19.

In an embodiment, step S33 of FIG. 19 comprises retrieving the at least one object feature representation from the pre-trained model based on information of capabilities of the user device.

In an embodiment, the pre-trained model comprises the object feature representations of objects belonging to the object class and weights assigned to the object feature representations. In this embodiment, step S33 of FIG. 19 comprises retrieving the at least one object feature representation from the pre-trained model based on the weights assigned to the object feature representations.

Figure 22:
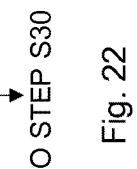
FIG. 22 is a flow chart illustrating an additional, optional step of the method shown in FIG. 19 according to an embodiment.

In an embodiment, the method comprises an additional, optional step S50 as shown in FIG. 22, which is preferably executed by the OD server. This step S50 comprises, in an embodiment, setting at least a portion of the weights assigned to the object feature representations based on information of object feature representations retrieved from the pre-trained model for at least one previous frame of the video stream. The method then continues to step S30 in FIG. 19.

In another embodiment, step S50 comprises setting the weights assigned to the object feature representations to default values based on reception, from the user device, of a notification that the object is a derailed object. The method then continues to step S30 in FIG. 19.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An object tracking device for augmented reality configured to determine a location of an object in a current frame of a video stream based on object feature representations extracted from different locations of a bounding box in the current frame and object feature representations belonging to a model of the object, wherein the model comprises at least one object feature representation extracted from at least one previous frame of the video stream and at least one object feature representation from a feature set comprising at least one server-generated object feature representation of objects belonging to a same object class as the object and that were not extracted from at least one previous frame of the video stream;

wherein the object tracking device further comprises a processor; and
a memory comprising instructions executable by the processor, wherein the processor is operative to determine the location of the object in the current frame of the video stream based on object feature representations extracted from different locations in the current frame and object feature representations belonging to the model of the object.

2. The object tracking device according to claim 1, wherein the processor operative to determine a bounding box representation for the object based on the object feature representations extracted from different locations in the current frame and the object feature representations belonging to the model of the object, wherein the bounding box representation defines a coordinate for a bounding box enclosing the object in the current frame and a size of the bounding box.

3. The object tracking device according to claim 2, wherein the processor is operative to determine $$B_n = \underset{B^*,m}{\mathrm{argmax}}\, d(X_n(B^*), X_m),$$

wherein $B_n$ indicates the bounding box representation for the object, d ( ) indicates a similarity measure representing a similarity between object feature representations, $X_m$ indicates an object feature representation belonging to the model of the object, $X_n(B^s)$ and indicates an object feature representation extracted from location $B^s$ in the current frame.

4. The object tracking device, according to claim 1; wherein the model $M_n$ of the object is selected from the group consisting of $\{X_0,Y_1,Y_2, \ldots, Y_K\}$, $\{X_{n-1},Y_1, Y_2, \ldots, Y_K\}$, and $\{X_{n-1}, X_{n-2}, \ldots, X_{n-T},Y_1, Y_2, \ldots, Y_K\}$, wherein $X_0$ indicates an object feature representation extracted from an initial frame $I_0$ of the video stream, $X_{n-1} \ldots X_{n-T}$ indicates an object feature representation extracted from previous frames $I_{n-1} \ldots I_{n-T}$ of the video stream with regard to the current frame $I_n$ (10), T is an integer equal to or larger than two, $Y_1 \ldots Y_K$ indicates a server-generated object feature representation from the feature set, and is an integer equal to or larger than one.

5. A user device comprising:
an object tracking device according to claim 1;
a camera configured to record video and generate a video stream;
a transmitter configured to transmit frames of the video stream to an object detection server; and
a receiver configured to receive a feature set from the object detection server.

6. The user device according to claim 5, wherein the transmitter is configured to transmit information of capabilities of the user device; and
the receiver is configured to receive the feature set generated by the object detection server based on the information of capabilities of the user device.

7. The user device according to claim 5, wherein
the receiver is configured to receive the feature set and information of a location of the object in the current frame determined by the object detection server; and
the object tracking device is configured to:
compare the determined location of the object with the information of the location of the object determined by the object detection server; and
select the location of the object in the current frame based on the information of the location of the object determined by the object detection server if a difference between the determined location and the location of the object determined by the object detection server exceeds a threshold difference value;
wherein the transmitter is configured to transmit, to the object detection server, a notification that the object is a derailed object if the difference exceeds the threshold difference value.

8. The user device according to claim 5, wherein said user device is selected from the group consisting of a mobile telephone, a smart phone, a laptop, a computer, a tablet, a game console, a head mounted display and augmented reality glasses.

9. An object tracking method performed by an object tracking device for augmented reality, the method comprising:
receiving a feature set from an object detection server; and
determining a location of an object in a current frame of a video stream based on object feature representations extracted from different locations of a bounding box in the current frame and object feature representations belonging to a model of the object, wherein the model comprises at least one object feature representation extracted from at least one previous frame of the video stream and at least one object feature representation from the feature set comprising at least one server-generated object feature representation of objects belonging to a same object class as the object and that were not extracted from at least one previous frame of the video stream.

10. The object tracking method according to claim 9, further comprising
recording video and generating the video stream; and
transmitting frames of the video stream to an object detection server.

11. The object tracking method according to claim 9, further comprising transmitting information of capabilities of a user device, wherein receiving the feature set comprises receiving the feature set generated by the object detection server based on the information of capabilities of the user device.

12. The object tracking method according to claim 9, wherein
receiving the feature set comprises receiving the feature set and information of a location of the object in the current frame determined by the object detection server, the method further comprising:
comparing the determined location of the object with the information of the location of the object determined by the object detection server; and
selecting the location of the object in the current frame based on the information of the location of the object determined by the object detection server if a difference between the determined location and the location of the object determined by the object detection server exceeds a threshold difference value;
transmitting, to the object detection server, a notification that the object is a derailed object if the difference exceeds the threshold difference value.

* * * * *